Dec. 22, 1970  R. M. SHIPLEY, JR  3,548,579
LOW PROFILE HARVESTER

Filed April 30, 1968  8 Sheets-Sheet 1

INVENTOR.
ROBERT M. SHIPLEY, JR.
BY
Schapp & Hatch
ATTORNEYS

Dec. 22, 1970  R. M. SHIPLEY, JR  3,548,579
LOW PROFILE HARVESTER
Filed April 30, 1968  8 Sheets-Sheet 3

INVENTOR.
ROBERT M. SHIPLEY, JR.
BY
Schapp & Hatch
ATTORNEYS

INVENTOR.
ROBERT M. SHIPLEY, JR.
BY
Schapp & Hatch
ATTORNEYS

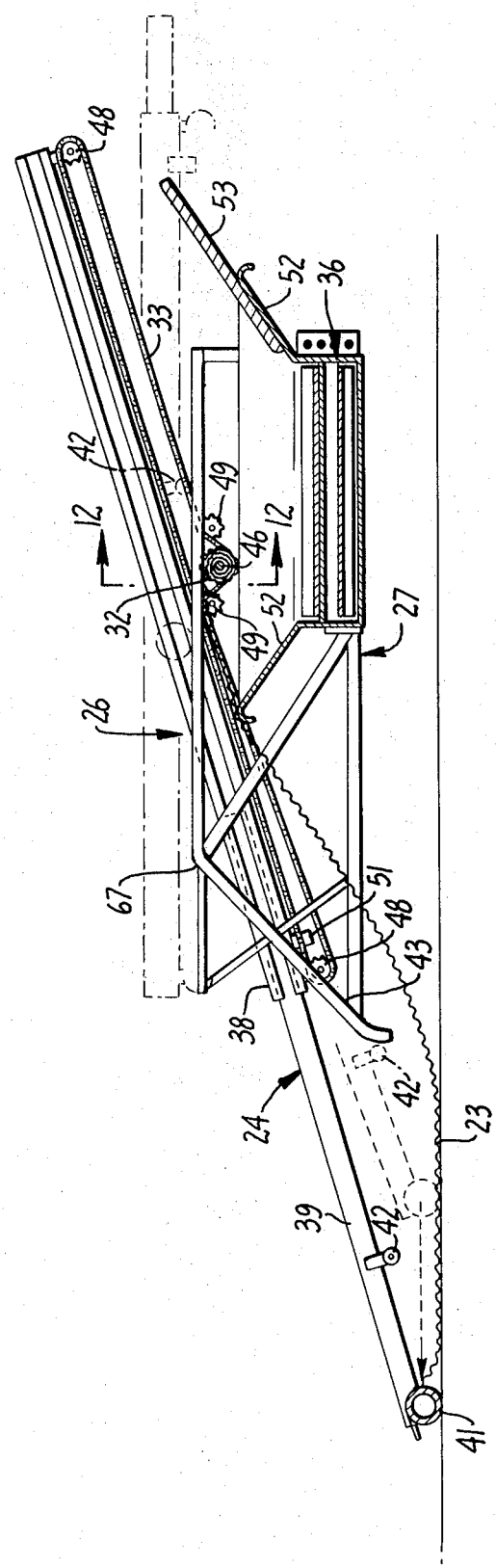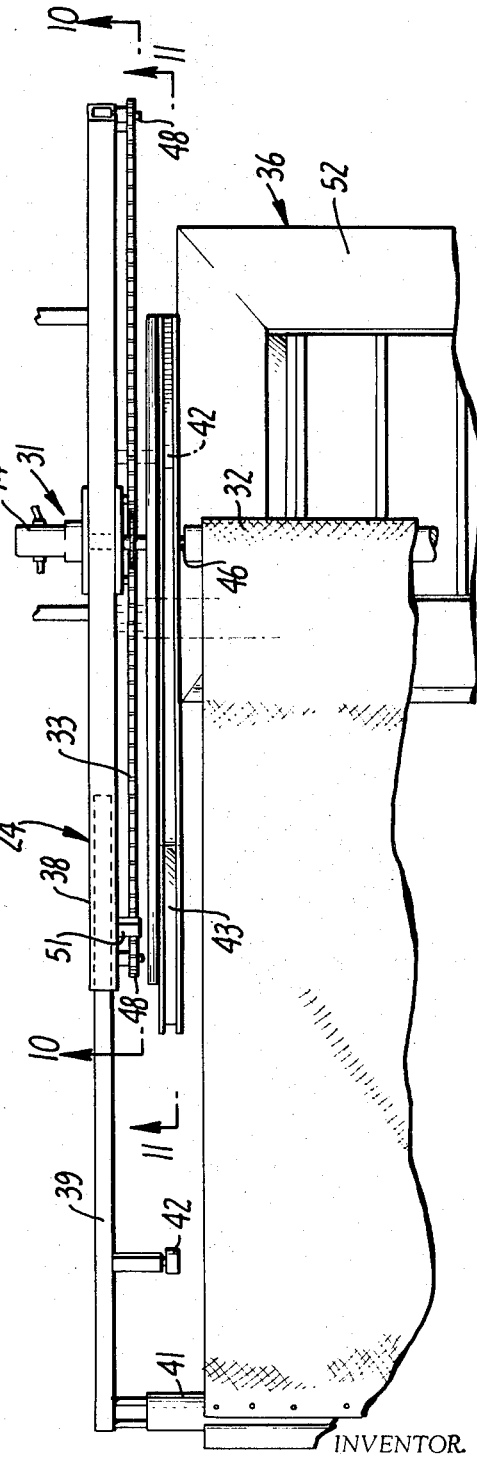

Dec. 22, 1970   R. M. SHIPLEY, JR   3,548,579
LOW PROFILE HARVESTER
Filed April 30, 1968   8 Sheets-Sheet 6
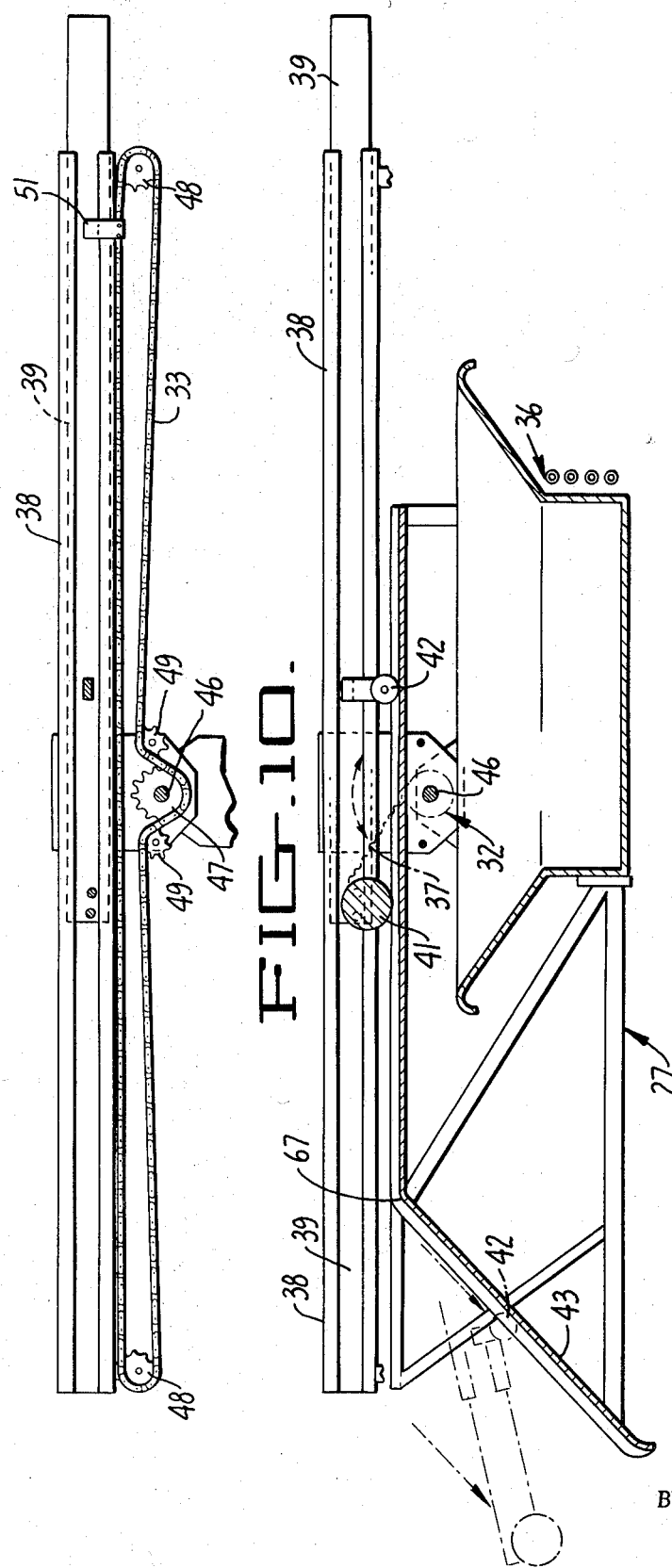
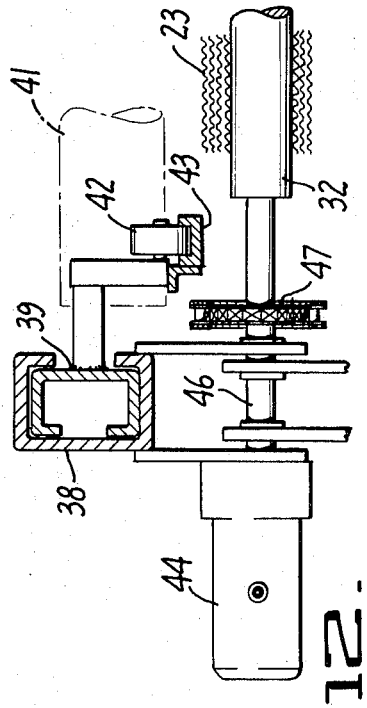
INVENTOR.
ROBERT M. SHIPLEY, JR.
BY
Schapp & Hatch
ATTORNEYS

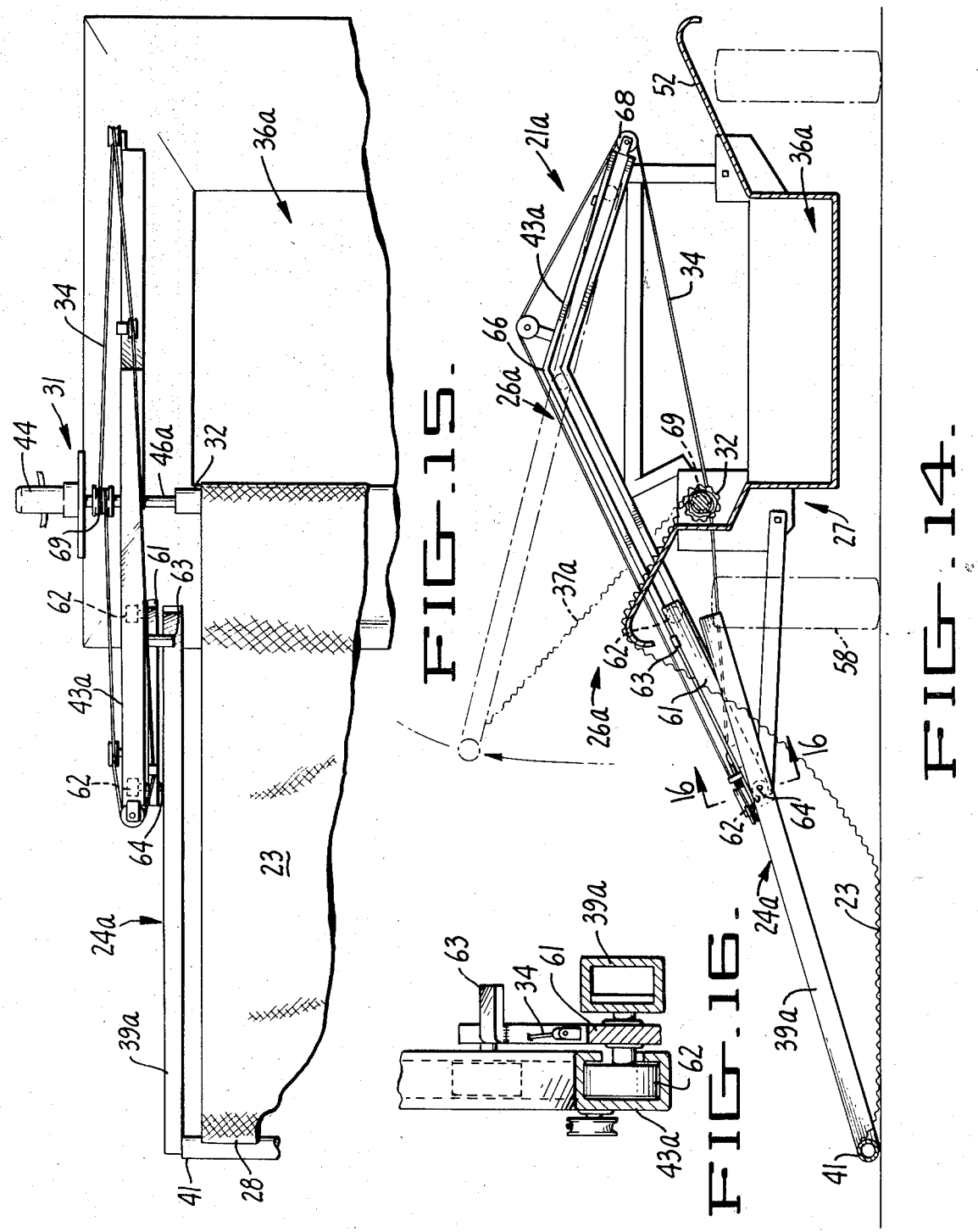

United States Patent Office 3,548,579
Patented Dec. 22, 1970

3,548,579
LOW PROFILE HARVESTER
Robert M. Shipley, Jr., Cloverdale, Calif., assignor to Kelsey-Hayes Company, Romulus, Mich., a corporation of Delaware
Filed Apr. 30, 1968, Ser. No. 725,280
Int. Cl. A01g *19/00*
U.S. Cl. 56—329                                    10 Claims

ABSTRACT OF THE DISCLOSURE

A mobile catchframe-type harvester for tree-borne fruit and nuts having an elongate chassis, a framework mounted on the chassis for transverse movement toward and away from the tree, and a slack fabric sheet carried on the framework. The fruit falls from the tree onto the slack sheet and is collected by operation of an unloader which tenses and tilts a limited portion of the slack sheet to cause the fruit to roll off while maintaining the low profile of the harvester. One edge of the slack sheet is carried by a roller driven by the same motive means as is used to drive the framework transversely beneath the tree, so that the desired degree of tension or slackness is maintained during extension and retraction of the framework. In one form of the invention, the slack fabric is tensed and tilted by elevation of the edge of the framework nearest the tree partway through the retraction of the framework from the tree, to load the fruit onto a conveyor adjacent to the roller. In another form of the invention, the slack fabric is tensed and tilted by the arcuate motion of a longitudinal bar beneath the fabric before the framework is retracted from the tree, to tilt the fabric toward the tree and carry the fruit off the edge of the slack sheet nearest the tree. A harvesting system is shown in which both forms of harvester are used jointly, with the second form unloading onto the first form, which in turn loads onto the takeoff conveyor, so that only one conveyor is required. An inertial shaker is shown in combination with the harvester.

BACKGROUND OF THE INVENTION

This invention relates to a low profile harvester, and more particularly to a mobile harvester of the catchframe type positionable beneath the branches of a tree to receive material knocked or shaken from the tree.

Previous harvesters of this type have suffered from a number of deficiencies, including the use of taut fabric sheets or panels of rigid material of insufficient resiliency to properly cushion the fall of delicate fruit from the tree, and objectionably high profiles which interfered with the ability of the harvester to extend beneath low-hanging branches. Such high profiles were necessary to achieve the desired degree of inclination of the catching surface to cause the harvested fruit to roll off.

A further problem with previous efforts in this area has been the requirement of excessive manpower for operation, through the use of two takeoff conveyors, each requiring an operator to change receiving boxes. Other deficiencies in ready mobility, excessive length of tumbling path down the inclined portion of the catchframe, and in clearing the catchframe surface of material thereon have also been noted.

SUMMARY OF THE INVENTION

The harvester of the present invention disposes a sheet of flexible material, such as fabric, in a slack state beneath the branches of a tree to receive the fruit or nuts to be harvested from the tree. After the fruit or nuts have fallen onto the sheet, which cushions the fall due to its slack state, a portion of the sheet is elevated and tilted in a taut state to cause the fruit or nuts to roll off for collection. One edge of the sheet is lower than the edge parallel to it, so that the crop tends to roll into a pocket formed adjacent to the lower edge. Only that portion of the sheet need then be tilted to clear the sheet of crop, allowing the harvester to have a low profile ideally suited for clearing low-hanging branches.

Tilting only a portion of the catching surface also reduces the distance which the crop tumbles sharply to the width of the tilted portion, rather than the entire width of the catchframe. A considerable improvement in the quality of the harvested crop results, especially when easily bruised fruit is being collected.

The number of operators required with the harvester of the present application is reduced, through the joint use of two of the harvesters, with one harvester gently unloading its collected crop into the other harvester, which in turn loads both the first harvester's collection and its own onto the single takeoff conveyor. As only one takeoff conveyor is necessary, only one operator need be employed to change receiving boxes. At the same time, the two harvesters are independently mobile and may be driven up alongside a tree and then extended over laterally toward the tree, so that one may advance to a new tree and begin to set up while the other finishes collection at the previous tree, for greatest flexibility and efficiency of operation.

For further speed and efficiency of operation, an inertial-type shaker may be carried by one of the harvesters, to provide the means for shaking the crop out of the tree for the catchframes to collect. Although the unloading mechanisms of the two harvesters shown differ in detail, both provide a snap action in the tilting and tensing process which tends to vibrate the catching sheet to improve the clearance of harvested material and even leaves from its surface.

Accordingly, it is a principal object of the present invention to provide a harvester of the character described which cushions the fall of the harvested crop onto the catching surface.

It is a further principal object of the present invention to provide a harvester of the character described having a low vertical profile suited to collection of crops from trees having low-hanging branches.

Yet another object of the present invention is to provide a harvester of the character described of increased speed, efficiency and mobility and having a decreased manpower requirement for operation.

A still further object of the present invention is to provide a harvester of the character described which rapidly and thoroughly removes harvested material from the catching surface.

Another object of the present invention is to provide a harvesting system including a pair of harvesters of the character described and an inertial shaker to provide a complete system for removal of crop from an entire tree at once and its collection and delivery to a single convenient site.

Further objects and advantages of the present invention will appear as the specification proceeds, and the new and useful features of the low profile harvester will be fully defined in the claims attached hereto.

BRIEF DESCRIPTION OF THE DRAWINGS

The preferred form of the present invention is illustrated in the accompanying drawings, forming part of this application, in which:

FIG. 8 is a cross-sectional view on an enlarged scale taken approximately along the plane of lines 8—8 of FIG. 3 and showing another form of the present invention;

FIG. 9 is a plan view of the same portion of the harvester as is depicted in section in FIG. 8;

FIG. 10 is a cross-sectional view on an enlarged scale taken approximately along the plane of lines 10—10 of FIG. 9;

FIG. 11 is a cross-sectional view on an enlarged scale taken approximately along the plane of lines 11—11 of FIG. 9;

FIG. 12 is a cross-sectional view on an enlarged scale taken approximately along the plane of lines 12—12 of FIG. 8;

FIG. 14 is a cross-sectional view corresponding to FIG. 8 but of a modified form of the invention;

FIG. 15 is a plan view of the portion of the harvester shown in section in FIG. 14; and FIG. 16 is a cross-sectional view on an enlarged scale taken approximately along the plane of lines 16—16 of FIG. 14.

Figure 1:
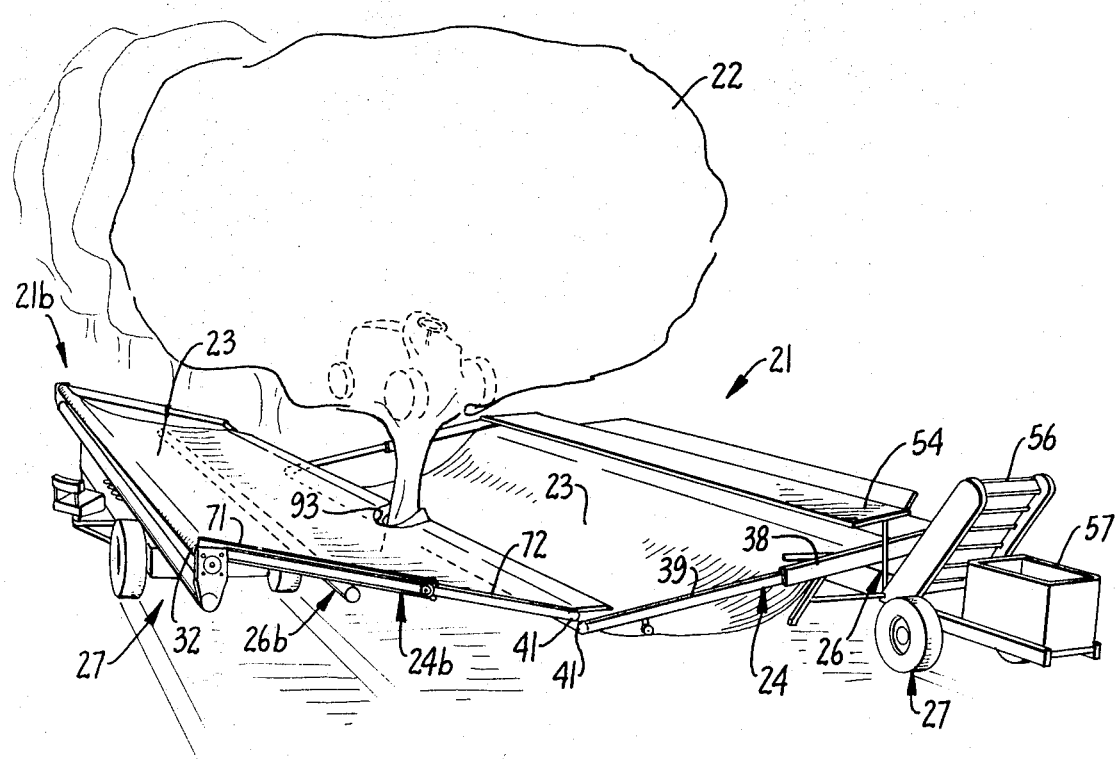
FIG. 1 is a perspective view showing a pair of harvesters of the present invention engaged with a tree to be harvested.

While only the preferred forms of the present invention have been shown, it should be understood that various changes or modifications may be made within the scope of the claims attached hereto, without departing from the spirit of the invention.

DESCRIPTION OF THE PREFERRED EMBODIMENTS

Referring to the drawings in detail, it will be seen that the low profile harvester 21 of the present invention is adapted for harvesting fruit and nuts borne by a tree 22, and includes a flexible catching sheet 23, a frame means 24 for disposing the sheet 23 under a tree in slack condition in position to catch fruit and nuts falling from the tree 22, and an unloader 26 formed for selectively manipulating the sheet 23 to cause fruit and nuts thereon to roll off the sheet 23 at a selected location.

The unloader 26 is formed for selectively elevating a portion of the sheet 23 to cause fruit and nuts to roll off the sheet. In elevating the sheet 23, the unloader 26 also tenses the sheet 23 so that tautly inclined portions of the sheet 23 are provided. A vibratory action is provided in portions of the sheet by the action of the unloader 26 snapping the sheet taut.

Figure 3:
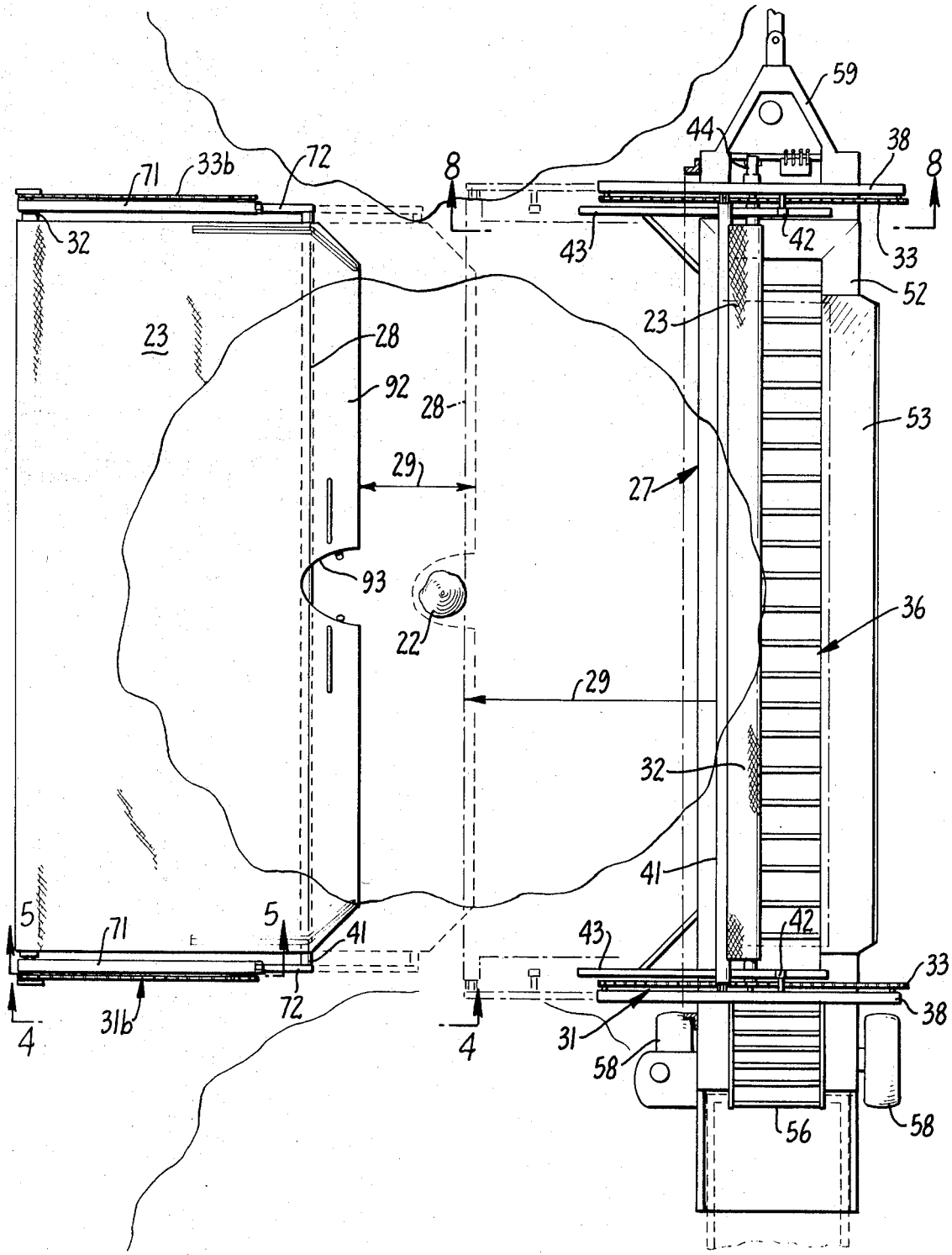
FIG. 3 is a plan view of a pair of harvesters of the present invention.

The frame means 24 and the sheet 23 are carried on a mobile support 27 for movement of an edge 28 of the sheet 23 toward and away from a tree to be harvested as shown by the arrows 29 in FIG. 3. A motive means generally indicated at 31 is provided on the mobile support 27 and is adapted for selectively effecting the movement of the edge 28 of the sheet 23.

The frame means 24 is formed for selective tilting to desired angles of inclination, and a roller means 32 is provided for reeling in and paying out the sheet 23 automatically in response to the movement of the sheet 23 and the framework 24 to maintain the desired degree of tension or slackness in the sheet 23 at various points along the path of extension and retraction. The motive means 31 is connected to the roller means 32 to roll up and pay out the sheet 23 either through a drive chain 33 in the forms of the invention shown in FIGS. 1 through 12 or through a drive cable 34 in the form of the invention shown in FIGS. 14 through 16.

In the form of the invention shown on the right-hand side of FIG. 3 and in detail in FIGS. 8 through 12, a takeoff conveyor 36 is located adjacent one margin of the sheet 23, to receive the crop from the sheet and convey it away. The margin of the sheet 23 along with the takeoff conveyor 36 lies is the lowest margin after the inclined portion of the sheet 23 has been tilted, so the crop will roll off the sheet 23 onto the takeoff conveyor 36.

As the framework 24 is retracted away from the tree, a portion 37 of the sheet 23, substantially less than the full transverse width of the sheet, is tipped upward after part of the retraction has occurred, as may be seen from the positions indicated in phantom lines in FIGS. 8 and 11. As the portion 37 of the sheet 23 is tipped upward to tilt its surface away from the tree and toward the takeoff conveyor 36, the portion 37 is tensed into a taut state by the roller means 32 so that any of the crop or other material remaining thereon is urged to roll down the short incline of its surface and into the takeoff conveyor 36. Due to the described snapping action of the sheet 23, as it is tensed, there is considerable vibratory action of the surface of the sheet to materially assist in clearing the surface of leaves or other material which would not otherwise roll down the incline.

The frame means 24 in this form of the invention includes two pairs of telescoped beam members 38 and 39 mounted transversely on the mobile support or chassis 27 at either end of the sheet 23. The beam member designated as 38 is pivotally attached to the mobile support or chassis 27 for swinging movement about an axis substantially co-linear with the axis of the roller means 32. The beam members 39 slide within the beam members 38 as shown in FIG. 12, and the ends of the beam members 39 which extend toward the tree are joined by a longitudinal bar member 41 to which the edge 28 of the sheet 23 is secured.

The extendable or inner beams 39 are equipped with guide rollers 42 which engage with and roll along a guideway 43 mounted on the mobile support 27. As the beam 39 forming part of the framework 24 is retracted away from the tree one of the guide rollers 42 contacts the lip of the guideway 43, as shown in phantom lines in FIG. 8. As the retraction continues the edge of the framework 24 nearest the tree 22, and bearing the edge 28 of the sheet 23, is gradually elevated during the time the guide roller 42 passes up the sloped portion of the guideway 43.

The motive means 31 as here shown includes a hydraulic motor 44 engaged with a shaft 46 which is in turn journalled on the mobile support 27. The shaft 46 bears the roller means 32 for winding up the sheet 23 and also bears a drive sprocket 47. The drive chain 33 is formed in a closed loop about a pair of idler sprockets 48, carried on the outer beam member 38, and is held in engagement with the drive sprocket 47 by another pair of idler sprockets 49.

The inner beam member 39 is attached to the drive chain 33 through a bracket 51 so that when the chain is driven in a counterclockwise direction, as seen in FIG. 10, the inner beam 39 is driven to the left from the fully retracted position shown in FIG. 10 to the fully extended position shown in solid lines in FIG. 8. In this process, the entire frame means 24 tips about the axis of the shaft 46 so that the longitudinal bar member 41 eventually contacts the ground surface and moves along it toward the tree 22. The valve (not shown) governing fluid flow to the hydraulic motor 44 may be of the metering type, so that the sheet 23 may be retracted at a moderate speed at first and the retraction then speeded up to produce the snapping action.

Figure 13:
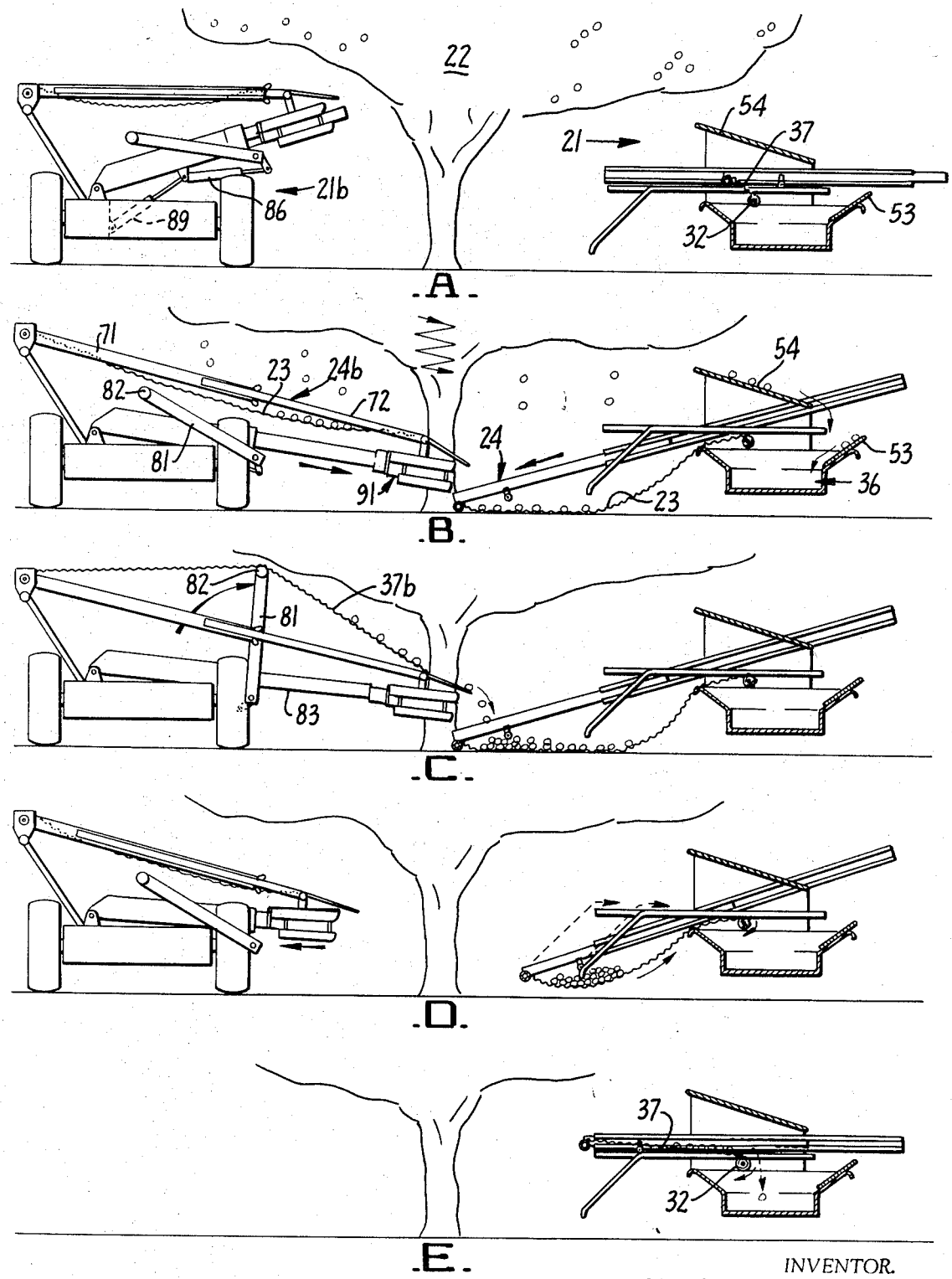
FIG. 13 is a sequential series of diagrammatic views illustrating the harvesting operation with the harvesters of the present invention.

Inclined deflectors 52 aid in guiding the harvested crop onto the surface of the takeoff conveyor 36. Where the inclined surfaces of the deflectors are exposed to the direct fall of fruit from the tree, a cushion 53 is provided to prevent damage to delicate crops. As shown in FIGS. 1 and 13, an additional cushion 54 may be provided above the surface of the takeoff conveyor 36 to prevent fruit falling directly from the tree from impinging directly onto the surface of the takeoff conveyor 36. This additional cushion 54, which is omitted from FIGS. 8 through 12 for the sake of clarity, gently deflects the fruit and keeps it from falling directly on the takeoff conveyor 36, the fruit instead rolling along the cushion 54, dropping off onto the cushion 53, and thence rolling into the takeoff conveyor 36, see FIG. 13B. As shown in FIG. 1, a short elevator conveyor 56 may be placed at the end of the takeoff conveyor 36 to lift the harvested crop for placement in a receiving box 57.

The mobile support 27 is equipped with a pair of wheels 58 and a tongue or draw bar 59 for connection to a tractor or other source of motive power. However, it should be appreciated that the harvester could be made self-propelled as is shown in the case of the harvester form shown in FIGS. 4 through 7. A tractor, if used, also serves as a handy source of hydraulic power for the hydraulic motor 44.

In the form of the invention shown in FIGS. 14 through 16, the transverse beam 38 of the embodiment of FIGS. 8 through 12 has been eliminated and its function assumed in part by guideways 43a generally corresponding to the guideways 43 of FIGS. 8 through 12. A carriage member 61 rides along the guideway 43a on rollers 62 travelling within the guideway 43a, which in this case is formed with a C-shaped cross-section as may be seen in FIG. 16. The transverse beam 39a is pivotally attached to the carriage 61 as shown at 64.

A dog 63 projects outwardly from the carriage 61 to limit the pivotal motion of the beam 39a. Thus, when the carriage is retracted along the guideway 43a by the drive cable 34, the carriage passes a vertical deviation 66 in the path of the guideway 43a. This causes the carriage 61 to swing downwardly and the dog 63 to contact the beam 39a, elevating the beam to the position shown in phantom in FIG. 14. This action provides the tautly inclined sheet portion 37a, indicated in phantom lines, similar to the portion 37 indicated in FIG. 11.

The elevation of the beam 39a, the transverse bar 41, and the edge 28 of the sheet 23 is abrupt so that the elevated portion 37a of the sheet 23 is simultaneously tilted and snapped taut to vibrate and clear itself of harvested crop and other material, which then rolls down the incline 37a and on to the takeoff conveyor 36a. The vertical deviation 66 in the guideway 43a is similar to the vertical deviation 67 provided in the guideway 43 in FIG. 11, but it provides a more abrupt movement for increased efficiency of removal of the harvested crop from the tilted portion 37a of the sheet 23.

The drive cable 34 is formed into a loop about guide rollers 68 mounted on the guideway 43a and mobile support 27. The cable 34 is also wound around a drive drum 69, carried on the shaft 46a for joint rotation with the roller means 32 by the hydraulic motor 44.

The operational sequence of the harvester 21 may be noted from the diagrammatic sketch sequence of FIG. 13. The embodiment of FIGS. 8 through 12 is schematically shown on the right-hand side of the tree 22 in this sequence of sketches, but it may be seen that the operation is for all purpose substantially identical with the operation of the embodiment of FIGS. 14 through 16. The harvester 21 is positioned alongside the tree in its retracted form as shown in FIG. 13A, and the framework 24 is then extended toward the tree as shown in FIG. 13B. This movement carries the sheet 23 under the tree in a slack condition to receive the crop.

It will be noted that some of the crop falling from the tree impinges on the cushion 54, rolls off to the cushion 53 and thence on to the takeoff conveyor 36. The right-hand harvester 21 then receives the crop collected by the left-hand harvester 21b in the operation shown in FIG. 13C and described below in connection with the embodiment shown on the left-hand side in these sketches.

In FIG. 13D the right-hand harvester 21 is shown retracting the framework 24 away from the tree. As may be noted from FIG. 13D, the harvested crop is caught in a pocket of the sheet 23 as the framework 24 is retracted and elevated by the action of the motive means 31 and the guideways 43. As shown in FIG. 13E, retraction of the framework 24 is continued after elevation to return the harvester to the condition illustrated in FIG. 13A, and the crop continues to roll off the inclined portion 37 as the sheet 23 is reeled in on the roller means 32.

The harvester 21b shown on the left-hand side of FIG. 13 is illustrated in more detail in FIGS. 4 through 7. In this form of the invention, the crop is removed from the surface of the sheet 23 while the framework 24b is still fully extended toward the tree 22, and retraction of the framework 24b is not associated with the collection of the crop. As here shown, the framework 24b includes at each end a pair of telescoping transverse beams 71 and 72 generally similar to the transverse beams 38 and 39 of the embodiment of FIG. 8. The beam 72 which extends nearest the tree 22 slides within the beam 71, but it has been found to be advantageous to equip the beam 72 with a pair of rollers 73 and to mount a pair of brackets 76 bearing rollers 74 on the end of the beam 71 from which the beam 72 projects to facilitate the extension of the beam 72 under the greater stresses imposed upon the framework 24b in this form of the invention. As with the previous embodiments, the ends of the beam 72 are joined by a longitudinal bar member 41 bearing the edge 28 of the sheet 23.

The unloader 26b includes a shaft 79 bearing at either end a pair of arms 81 having their ends attached to and supporting a longitudinal bar member 82. The shaft 79 is journalled on a boom 83 for rotation about an axis generally longitudinal to the harvester 21, and the boom 83 is in turn pivotally mounted on the mobile support or chassis 27 as shown at 84. A hydraulic cylinder 86 extends between a bracket 88, mounted on the boom 83, and a crank arm 87, attached to the shaft 79, for moving longitudinal bar 82 to bring about the unloading of the sheet 23 as described below. Another hydraulic cylinder 89 extends between the mobile support or chassis 27 and the bracket 88 for adjusting the height of the boom 83 and for swinging the boom 83 into the position shown in phantom lines in FIG. 4.

Figure 4:
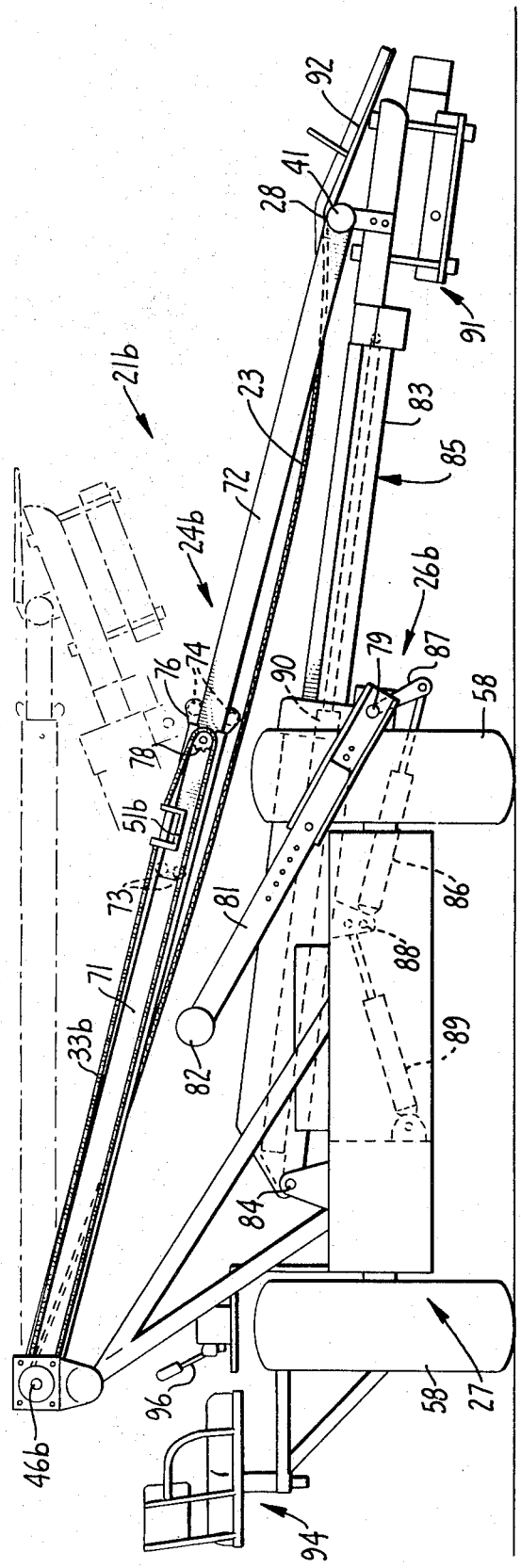
FIG. 4 is a cross-sectional view on an enlarged scale taken approximately along the plane of line 4—4 of FIG. 3.
Figure 5:
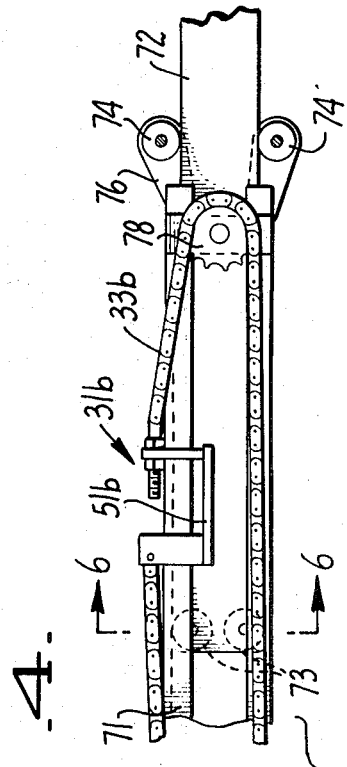
FIG. 5 is a fragmentary cross-sectional view on a enlarged scale taken approximately along the plane of lines 5—5 of FIG. 3.
Figure 6:
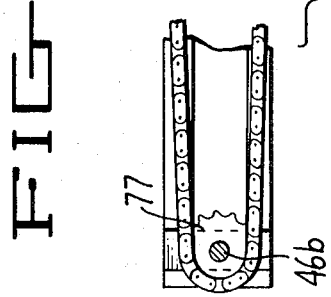
FIG. 6 is a cross-sectional view on an enlarged scale taken approximately along the plane of lines 6—6 of FIG. 5.
Figure 7:
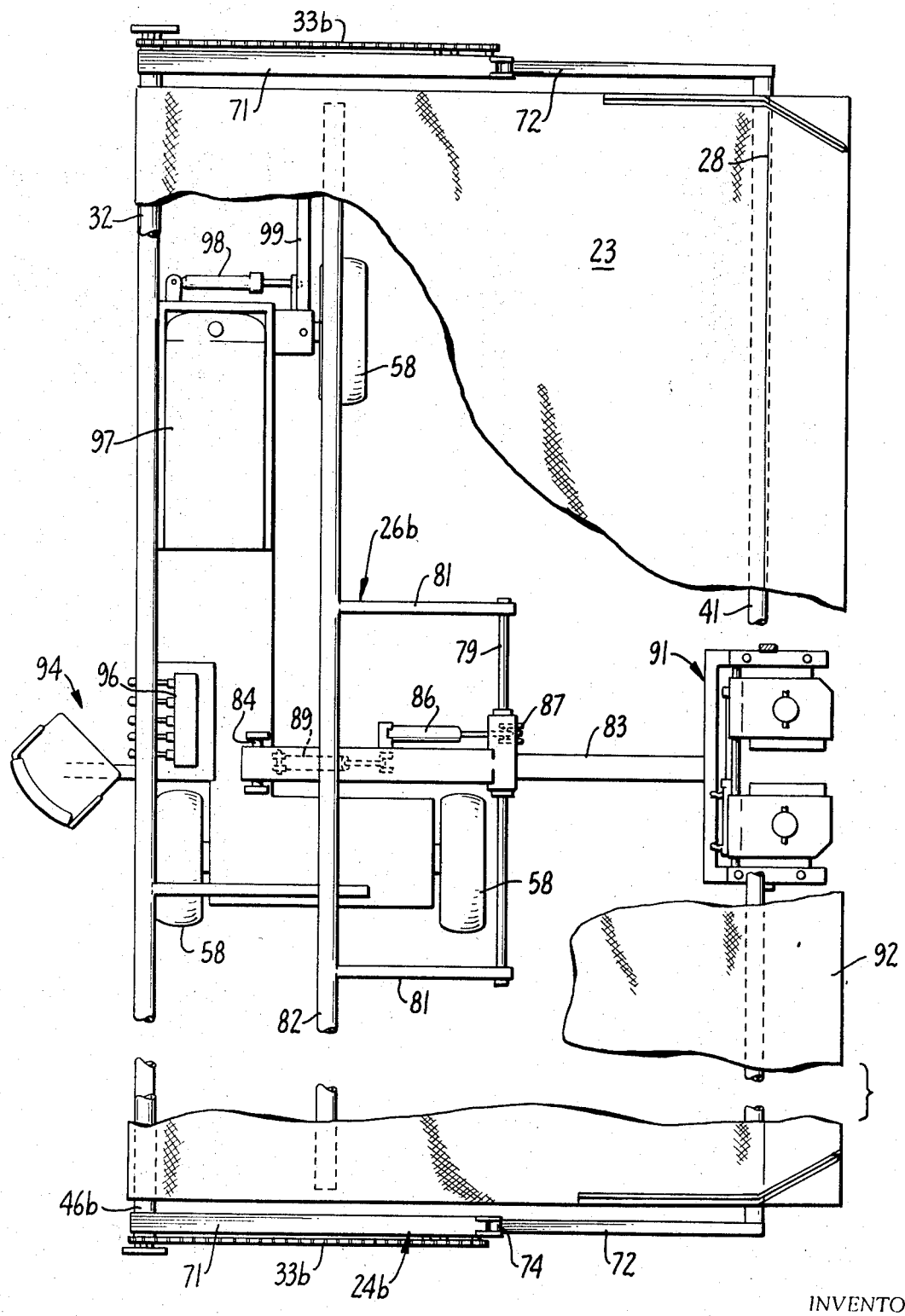
FIG. 7 is a plan view with portions broken away of the form of the invention shown in FIG. 4 and the left-hand side of FIG. 3.

The motive means 85 for extending the framework 24b in the present embodiment includes a long hydraulic cylinder 90 within the boom 83, as shown in phantom lines in FIG. 4. The boom 83 has inner and outer members which telescope, and the cylinder 90 extends between the inner and outer members to control the telescoping. The boom 83 is attached at its outer end to the longitudinal bar member 41, so that the bar member is carried toward and away from the tree 22 by the telescoping and extension of the boom 83. The movement of the bar member 41 moves the beam member 72 with respect to the beam member 71, actuating the drive chain 33b.

The drive chain 33b is disposed in a loop about a pair of sprockets 77 and 78, borne on beam 71. The upper sprocket 77 is attached to the shaft 46b in common with the roller means 32. A bracket 51b is attached to the beam 72 and the drive chain 33b in a fashion similar to bracket 51 of the embodiment of FIG. 8. The extension of the beam 72 with respect to beam 71 upon extension of the boom 83 by the hydraulic cylinder 90 moves the drive chain 33b around the loop path to drive the sprocket 77 and hence the roller means 32 on the shaft 46b. The extension and retraction of the sheet 23 is therefore synchronized with the extension and retraction of the framework 24b.

It may be seen that although the operation of the motive means 85 is in a sense the reverse of the operation of the motive means 31 and 31a of the embodiments of FIG. 8 and FIG. 14 respectively, the result is essentially the same, that the movement of the sheet 23 is coordinated with the movement of the framework 24b. It should be appreciated that the motive means 31 of the embodiment of FIG. 8 or the motive means 31a shown in FIG. 14 could also be used in the harvester 21b of the present embodiment at some sacrifice in simplicity.

The edge of the sheet 23 attached to the roller means 32 is supported higher than the edge 28 attached to the longitudinal bar 41 when the framework 24b is extended, so that the sheet 23, although slack, extends in a gentle slope toward the tree. As a result of the slack state of the sheet 23 there is a natural tendency for it to form a shallow pocket near the edge 28, so that harvested crop falling on the sheet 23 tends to roll to the lower edge of the sheet.

The present form of the invention is well suited for use in combination with an inertial shaker for vibrating the tree 22 to remove the crop from its branches. Such an inertial shaker may take many forms, but an inertial shaker of the type disclosed in my U.S. Pat. No. 3,338,040 has been found to be particularly advantageous. Such a shaker 91 is shown mounted on the end of the boom 83 nearest the tree. The increased bearing capacity mentioned above for the framework 24b through the use of the rollers 73 and 74 facilitates the ease of retraction and extension of the framework bearing the additional load of shaker 91.

A deflector 92 is mounted along the forward edge of the framework 24b extending toward the tree from the longitudinal bar 41 and is notched above the shaker 91 as shown at 93 to accommodate the trunk of the tree. The deflector 92 guides crop falling on it and delivered to it by the action of the unloader 26b onto the harvester 21 on the opposite side of the tree.

An operator's cockpit 94 is provided on the mobile support 27 on the side opposite the tree and is equipped with hydraulic valves 96 for controlling the operation of the hydraulic cylinders 86, 89 and 90, the shaker 91 and the forward motion of the wheels 58. Certain of the valves 96 may be of the metering type if desired, for ease of exact positioning and control of the speed of movement of the bar 82 to produce the snapping vibratory action in the sheet 23. While the motive means such as the cylinders 86, 89 and 90 have been described in terms of hydraulic power, it should be appreciated that they could also be in other forms capable of achieving the described movement. To supply the necessary power, a power plant 97, which may consist of an internal combustion engine driving a hydraulic pump and the appropriate reservoir and valving system, is mounted on the mobile support 27. To steer the harvester 21, the front wheel 58 may be pivotally mounted on the mobile support 27 and moved from side to side by means of a bracket 99 and a hydraulic cylinder 98 extending between the bracket 99 and the mobile support 27.

Figure 2:
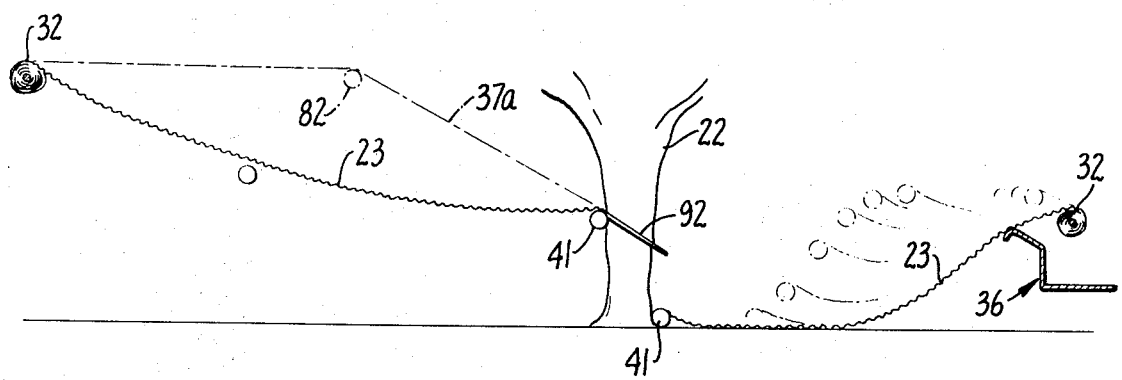
FIG. 2 is a diagrammatic view in section taken approximately along the plane of line 2—2 of FIG. 1, with parts removed for clarity.

The operation of this form of the harvester 21b may be seen from the left-hand sides of FIGS. 2 and 13. As shown in FIG. 13A, the harvester 21b is positioned alongside the tree 22 in its retracted position. In FIG. 13B the boom 83 has been extended to bring the framework 24b bearing edge 28 of the sheet 23 immediately adjacent to the trunk of the tree 22 by a retraction of the hydraulic cylinder 89 and the operation of the motive means 85 to extend the boom 83. The shaker 91 is engaged with the trunk of the tree to vibrate the tree as indicated by the jagged arrow.

Crop shaken from the tree then falls on the slack sheet 23 and rolls toward its lower edge, in the vicinity of the trunk of the tree. The hydraulic cylinder 86 is then retracted to raise the longitudinal bar 82 into contact with the underside of the slack sheet 23 to elevate and tense a portion of the sheet, forming a taut inclined portion 37b functionally similar to the taut inclined portions 37 and 37a shown in the first two embodiments. As it is elevated, the bar 82 is swept in an arc about the shaft 79 transversely toward the edge 28. The crop rolls off the taut inclined portion 37b, across the deflector 92, and onto the harvester 21 on the opposite side of the tree.

The hydraulic cylinder 86 may be extended again to lower the longitudinal bar 82, and the motive means 85 operated to retract the framework 24b, the boom 83 and the shaker 91 away from the tree as shown in FIG. 13D. While this takes place, the harvester 21 on the right-hand side of the tree is shown in FIG. 13D is collecting the harvested crop and placing it in the take-off conveyor 36. During the time the right-hand harvester 21 is retracting, the harvester 21b on the left-hand side of the tree may be advancing to the next tree in the row to begin the set-up process shown in FIGS. 13A and 13B. As may be noted from FIG. 13, only a portion of the full transverse width of the sheet 23 is elevated, tilted, and tensed so that in both forms of the invention length of path of tense material of reduced resilience along which the fruit must roll is reduced and a low profile is obtained for the harvesting apparatus without interfering with the efficient roll-off of the harvested crop.

From FIG. 13 it may be seen that the two harvesters 21 and 21b, each on one side of the tree 22, constitute a complete harvesting system. The harvesters 21 and 21b may be generally designated as mobile catchframes, which between them cover substantially the entire area beneath the branches of the tree. The left-hand harvester or catchframe 21b unloads its harvested crop onto the right-hand harvester or catchframe 21 by tilting its slack sheet 23 toward the tree, and the right-hand harvester or catchframe 21 then collects that crop together with the crop falling directly onto it by tilting its slack sheet 23 away from the tree, and toward the takeoff conveyor 36.

While the harvester 21b has been shown bearing an inertial shaker 91 of the trunk type, one or more limb-type shakers such as disclosed in my U.S. Pats. Nos. 3,059,402 and 2,183,656, mounted on a suitable arm attached to the mobile support 27, could be used either in addition to or instead of the shaker 91. The harvesting system as shown in FIG. 13 is not restricted to the use of one harvester 21 of the embodiment of FIG. 8 and one harvester 21b of the embodiment of FIG. 4, but may also employ two harvesters 21 or 21a, or one each of the forms 21 and 21a, and any or all of the harvesters used may have a limb shaker attached as suggested above.

Together with the inertial shaker 91, the two catchframes 21 and 21b form a speedy, efficient and highly mobile system for removal of the crop from an entire tree at once with the minimum of manpower, thorough removal of the harvested material from the catching surface and the collection and delivery of the harvested crop from both sides of the tree to a single convenient site. At the same time, the harvesters or catchframes 21 and 21b treat the harvested crop material very gently by cushioning its fall, limiting the distance which it tumbles along the tensed sheet and preventing it from falling directly on hard mechanical parts such as the takeoff conveyor 36 or the shaker 91 and at the same time retain a generally low configuration well suited to extension under the low-lying branches of the tree.

I claim:

1. A fruit and nut harvester comprising:

a wheeled frame, a roller supported on said frame and adapted for positioning in laterally spaced relation to the trunk of a tree to be harvested, a member supported by said frame for reciprocation between an extended position adjacent said trunk and a retracted position adjacent said roller, a sheet having one edge secured to and wound upon said roller and an opposite edge secured to said member, and drive means connected to and providing a predetermined drive ratio between said member and roller for displacing said member between said positions and simultaneously driving said roller for paying out and reeling in of said sheet as said member is moved to extended and retracted positions respectively.

2. A tree harvester as defined in claim 1 wherein said drive means includes an endless drive connecting said member and roller.

3. A harvester as defined in claim 2,
a drive shaft for said roller, and
said endless drive being connected to said member and being entrained about for driving said shaft.

4. A harvester as defined in claim 1,
said sheet being wound on said roller to extend from the upper side thereof for delivery of fruit over the top of said roller during the reeling in of said sheet,
fruit receiving means mounted adjacent to said roller in position for receiving fruit therefrom,
said member in extended position having an elevation below said roller, and
means elevating said member during movement thereof to retracted position for delivery of fruit to the roller end of said sheet for passage to said receiving means.

5. A harvester as defined in claim 4,
said drive means being constructed to provide relatively slack and taut conditions of said sheet in the extended and retracted positions respectively of said member.

6. A harvester as defined in claim 5,
said member elevating means being constructed to provide abrupt elevation of said member with snap action.

7. A fruit and nut harvester comprising:

a mobile collapsible frame having opposite sides movable to relatively extended and retracted positions, a roller carrier by one side, a sheet having one edge secured to and wound upon said roller and an opposite edge secured to said other side, drive means connected to and providing a predetermined drive ratio between said sides and roller for displacing said sides between said positions and simultaneously driving said roller for paying out and reeling in said sheet as said sides are moved to extended and retracted positions respectively, and means for delivering fruit from said sheet in the extended position of said frame comprising a part movable vertically against the underside of said sheet to produce an inclined fruit delivery ramp.

8. A harvester as defined in claim 7,
said part being of elongated form and mounting means therefor disposing said part generally parallel to said roller and member and causing said part to sweep the underside of said sheet in a direction substantially perpendicular to said roller and member during the course of its vertical movement relative to said sheet to cause progressive displacement of fruit on said sheet.

9. A harvester as defined in claim 8 wherein said mounting means is pivoted about a substantially horizontal axis substantially parallel to said roller and member for arcuate reciprocal displacement of said part.

10. An apparatus as defined in claim 9 wherein the edge of said sheet nearest the tree is disposed at a lower elevation than the edge of said sheet farthest from the tree.

References Cited
UNITED STATES PATENTS

| | | | |
|---|---|---|---|
| 2,436,648 | 2/1948 | Isom | 56—329 |
| 3,250,065 | 5/1966 | Frost | 56—329 |
| 3,338,041 | 8/1967 | Arpin | 56—329 |
| 3,347,032 | 10/1967 | Pool et al. | 56—329 |
| 3,370,409 | 2/1968 | Stong | 56—328 |
| 3,440,809 | 4/1969 | Maxwell | 56—329 |
| 3,462,931 | 8/1969 | Thayer | 56—329 |

RUSSELL R. KINSEY, Primary Examiner